United States Patent [19]

Greene

[11] 3,994,353
[45] Nov. 30, 1976

[54] VEHICLE HAVING A MECHANICAL DRIVE, A PUMP, A VARIABLE-DISPLACEMENT MOTOR AND A METHOD OF DRIVING THE VEHICLE

[76] Inventor: Clarence Kirk Greene, Arlington Tower, 100 N. Arlington Ave., Reno, Nev. 89501

[22] Filed: June 23, 1975

[21] Appl. No.: 589,355

[52] U.S. Cl. .............................. 180/14 A; 180/49; 180/66 R; 180/44 M
[51] Int. Cl.² ........................................ B62A 59/04
[58] Field of Search ............. 180/14 A, 14 R, 14 B, 180/14 D, 14 E, 44 M, 49, 66 R

[56] References Cited
UNITED STATES PATENTS

| | | | |
|---|---|---|---|
| 3,354,977 | 11/1967 | Swift | 180/44 M |
| 3,354,978 | 11/1967 | Budzich | 180/44 M |
| 3,415,334 | 12/1968 | Vriend | 180/44 M |
| 3,612,202 | 10/1971 | Moom | 180/14 A |
| 3,817,341 | 6/1974 | Greene | 180/14 D |
| 3,913,697 | 10/1975 | Greene | 180/14 A |

Primary Examiner—Robert R. Song
Assistant Examiner—John P. Silverstrim
Attorney, Agent, or Firm—Oswald H. Milmore

[57] ABSTRACT

A vehicle, such as a single truck or a truck-and-trailer combination, having a power plant, has primary ground-engaging wheels driven by the power plant and a hydraulic pump, also driven by the plant and connected by ducts to a variable-displacement motor which is mechanically coupled to drive secondary driving wheels, e.g., tandem wheels on the truck or wheels on a trailer, there being first and second ducts between the pump and motor, and the displacement of the motor can be altered to equalize substantially the pressures within the two ducts when the vehicle moves ahead on straight road affording good traction. Substantially no power is transmitted through the ducts while the vehicle moves on said road, but when one of, e.g., the primary driving wheels slips, either forwardly or backwards, hydraulic fluid is transmitted through the ducts to retard or speed-up the primary driving wheel through the pump.

1 Claim, 4 Drawing Figures

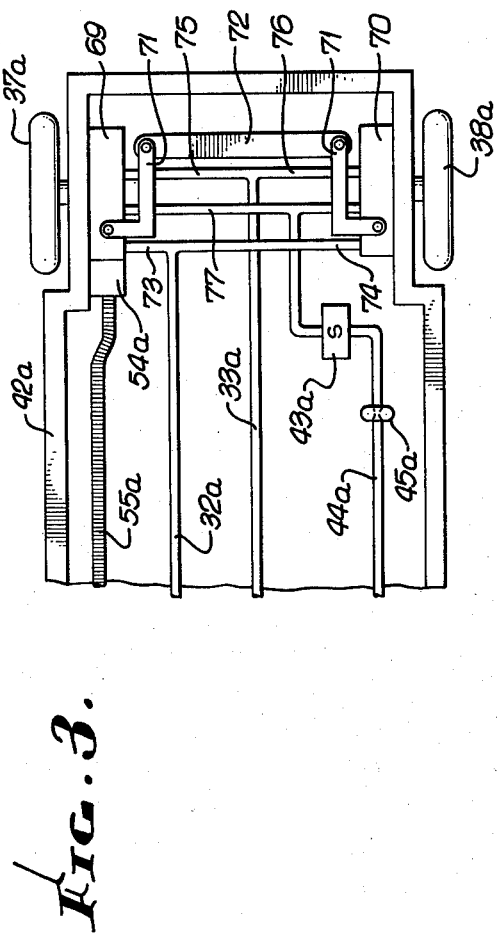
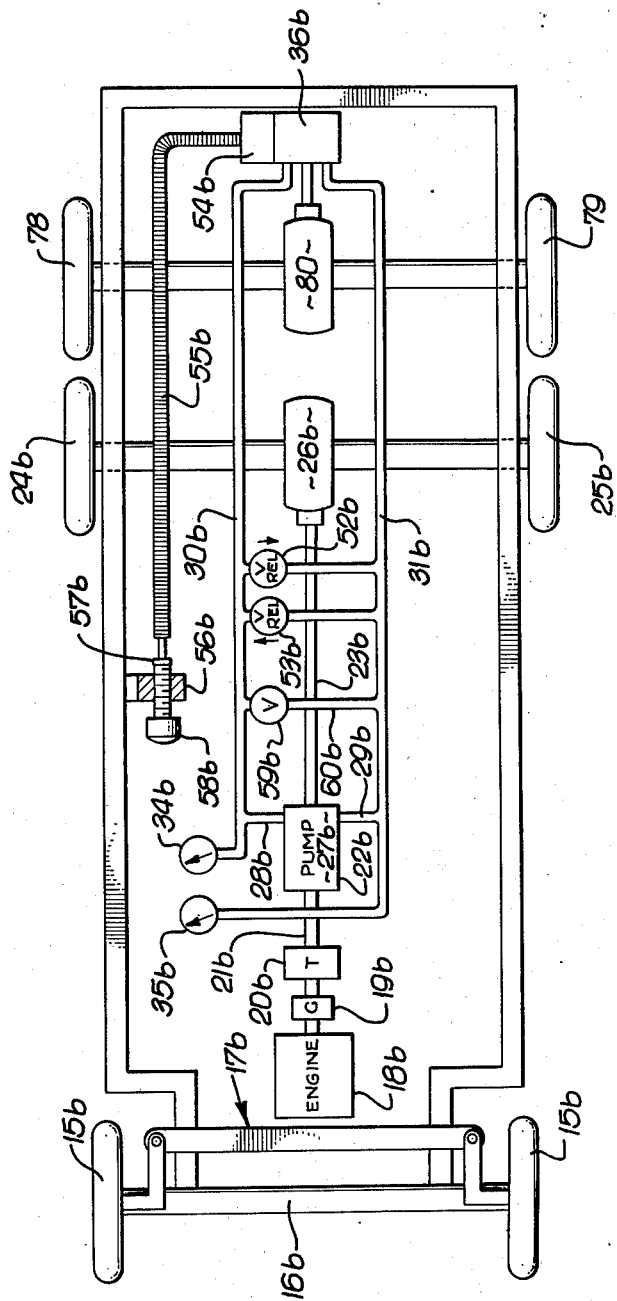

VEHICLE HAVING A MECHANICAL DRIVE, A PUMP, A VARIABLE-DISPLACEMENT MOTOR AND A METHOD OF DRIVING THE VEHICLE

The invention relates to vehicle means, such as single vehicles or truck-and-trailer combinations, having a vehicular power plant and primary and secondary ground-engaging driving elements, of which the first is coupled mechanically to the power plant and the second is driven by a variable-displacement hydraulic motor which is connected by ducts to a hydraulic pump which is also driven by the power plant. More particularly, the invention is concerned with altering the displacement of the motor to equalize substantially the pressures within the ducts.

In one, but not the exclusive, application the vehicle means is a truck-and-trailer combination wherein the primary driving element is on the truck and the secondary driving element is on the trailer; but the vehicle means may include a single truck having both the primary and secondary driving elements thereon, e.g., situated in tandem on different transverse axes. In either embodiment, the driving elements may be wheels.

A power take-off unit is provided for the pump; this may be a purely mechanical take-off device but may include a device which distributes torques between the primary driving element and the pump.

The problem

In drive systems for vehicle means having a plurality of ground-engaging driving elements, wherein the secondary element is driven by a hydraulic motor fed by a pump which is driven by the vehicular power plant, it has been difficult to distribute the power among the several elements, or to absorb power from them in a desired ratio. When the motor displacement is not properly adjusted so as to cause the pressures within the ducts to be approximately equal while the vehicle means is moving forwardly on road affording good traction, power is lost, since the pump either drives the motor or is driven by the motor. This loss of power is dissipated as heat to the hydraulic fluid and/or to the tires, and, if extreme, causes skidding of one or both of the wheels or other ground-engaging driving elements.

This difficulty was resolved, according to the invention of my copending patent application. Ser. No. 475,655, filed June 3, 1974, now U.S. Pat. No. 3,913,697, dated Oct. 11, 1975, for the case of a vehicle means having a variable displacement pump. But often it is desirable to have the motor of variable displacement (using a pump which may have a fixed but, optionally, also a variable displacement). One advantage of using a variable-displacement motor and a fixed-displacement pump is that a costly torque-diving or other mechanical take-off device can be avoided, and the pump can be driven at a fixed speed ratio to the primary driving element.

In such a vehicular drive system it is desirable to produce driving (or retarding) forces on the secondary driving element, such as the wheels on an added, tandem axle on a truck or on trailer wheels, under certain operating conditions sufficiently great to advance the vehicle means, as when starting, when the ground traction is poor, when operating the vehicle means in reverse, and/or when decelerating or descending a long grade; but when the vehicle means is on firm ground and/or moving forwardly at a more or less constant speed, as on a level road affording good traction, the driving force on the primary driving element, as on the mechanically driven truck wheels, is sufficient to maintain the vehicle means in its motion and efficiency of the drive system is improved by reducing or eliminating the hydraulic power supplied to the secondary driving element, making the latter element free-wheeling. In this connection is should be noted that the efficiency of a mechanical transmission is always greater than that of a hydraulic system.

A further difficulty of prior drive systems is the complexity of and their virtual or complete inability to apply driving (or retarding) force to the several driving elements automatically. It is desirable to apply power from the power plant to the driving elements on the secondary axle, as well as to receive power from that axle through the hydraulic system immediately upon any change in the speed ratio of the secondary to the primary driving elements. Such a system causes an automatic correction, without any conscious or deliberate part of the vehicle operator.

The hydraulic connection of the vehicular power plant to the secondary driving element, especially when the element is one or more trailer wheels, is also highly desirable for reducing the danger of jack-knifing, since it permits the compressive force on the trailer draw-bar to be reduced, advantageously placing the draw-bar into tension under all conditions of operation. It was difficult to achieve this condition in prior systems.

Objects

The principal object of the invention is to provide a method of driving a vehicle means having a power plant by applying power hydraulically to the secondary driving element subsantially only when the speed ration of the primary and secondary ground-engaging driving elements is altered (from the condition in which both elements move forwardly at a common speed, as occurs when the vehicle means moves forwardly on straight, approximately level road affording good traction) the primary driving element being on the truck, by controlling the displacement of the hydraulic motor which drives the secondary driving element.

Ancillary to the foregoing, an object is to provide a method wherein the transmission of power through the ducts between the pump and the motor occurs substantially only when the said ration is altered.

According to another aspect, a principal object is to provide a drive system for self-propelled vehicle means having a power plant wherein the plant is coupled mechanically to drive the primary driving element and is further coupled to drive a hydraulic pump which drives a hydraulic motor through connecting ducts, the motor having a variable displacement and being connected to the secondary driving element, wherein means are provided for varying the displacement of the motor to attain good efficiency under varying operating conditions. Specific objects thereunder are:

1. To provide means to balance the pressures within said connecting ducts for attaining good efficiency of the drive system.

2. To insure that the flow of hydraulic power from the pump to the motor, and also from the motor to the pump, is substantially nil save when the ratio of the speeds of the primary and secondary ground-engaging driving elements differs from the ratio of speeds which prevails when the vehicle means is moving forwardly on straight road affording good traction.

Additional objects, attained only in certain embodiments, are:

To provide a drive system for self-propelled vehicle means of the kind described above which includes a pump driven by a vehicular power plant and connected by ducts to a variable-displacement motor which is drivingly coupled to the secondary driving element, wherein the system has means for varying the motor displacement for fixing the relationship of the pressures within said connecting ducts.

To provide a drive system for self-propelled vehicle means which includes means for indicating to the operator of the vehicle means the relationship of the pressures in the said ducts that interconnect the pump and motor, the motor being of variable displacement, whereby the operator can vary the motor displacement to bring the pressures within said ducts to approximate equality or to a desired relationship.

Summary

The vehicle means, carrying a power plant and having primary and secondary ground-engaging driving elements situated on different transverse axes, includes a power take-off unit which drives the primary driving element mechanically and which also drives a hydraulic pump which is connected by ducts to a variable-displacement hydraulic motor which is, in turn, drivingly coupled to the secondary driving element, and means are provided for varying the displacement of the motor.

Preferably, the system includes means for indicating the relationship of the pressures within the ducts, such as pressure gages, and the means for varying the motor displacement are controllable by the vehicle operator who can see the indicating means such as the gages.

A by-pass valve interconnecting the said ducts, controllable by the vehicle operator, is preferably provided, to permit equalization of the pressures within the ducts, effectively placing no load upon the pump and motor and placing the secondary driving element into free-wheeling.

The by-pass valve, when open, permits the pump and the motor to turn independently of each other, without the transmission of hydraulic power from one to the other. Since under most operating conditions the pump and the motor turn in the same direction, only a small part of the hydraulic fluid flows through the by-pass valve and it can, therefore, be of a smaller size than that necessary to carry the maximum flow of the pump or motor. When the motor displacement is not matched to that of the pump a greater part of the fluid flow caused by the pump and/or motor goes through the by-pass valve. Such a by-pass valve, when open, avoids skidding, excessive tire wear, etc., and reduces wear on the pump and motor, and greatly reduces the loss of power due to the hydraulic system. But a disconnect clutch may be provided between the hydraulic motor and the secondary driving element, if desired in addition to or in lieu of the by-pass valve.

There need be only one hydraulic motor for the secondary driving element (which may consist of the several wheels on one or more transverse axes, as on the trailer or on the truck, in the latter case being arranged in tandem with the primary driving element of the truck), or a separate hydraulic motor may be provided for each wheel of the secondary driving element. When several such motors are used, they are advantageously connected hydraullically in parallel, to permit rotations of the several wheels at different speeds, but it is desirable that the displacements of such motors be approximately equal or balanced, i.e., slightly different depending upon the tread diameters of the wheels. Such a balance between the several motors can be attained by suitable interconnecting means, such as a mechanical linkage, although other connections, such as hydraulic or electrical may be used. When a single motor is used to drive several wheels, the latter are preferably driven through differential gears and the input to the differential is connected to the motor.

The expression "normal displacement" is herein used to denote the relationship of the pump and motor displacements at which, when the primary and secondary ground-engaging driving elements are moving at a common ground speed, the pump (or pumps) and the motor (or motors) displace hydraulic fluid at a common rate, so that the pressures within the two connecting ducts are equal. This common ground-speed is attained when the vehicle means moves straight ahead on road affording good traction.

It may be noted that minor changes from normal displacement, caused, e.g., by variations of the tread diameters due to changes in the pressure of tire inflation, cause significant changes in the rates of hydraulic fluid flow induced by the pump and motor, leading to power losses. It is, therefore, important to maintain the normal displacement, as by equalizing the pressures within the connecting ducts during normal operating conditions.

But when the vehicle means turns, e.g., goes on a curve, the trailer wheels take a shorter path than that taken by the towing truck. This causes the pump to pump more fluid than can be accepted by the motor, resulting in a temporary unbalance in the pressures within the ducts (assuming the by-pass valve to be closed). Such temporary deviations from equality in pressures is not normally corrected according to the invention, and is dissipated by leakage of fluid in the pump and/or motor, a separate return conduit for leaked fluid being provided.

DRAWINGS

The accompaying drawings show certain preferred embodiments, by way of illustration, of vehicles provided with the drive system of the invention, wherein:

FIG. 3 is a fragmentary view of the rear end of a trailer, showing the second embodiment; and FIG. 4 is a schematic plan of a single truck, showing the third embodiment of the invention.

FIRST EMBODIMENT

Figure 1:
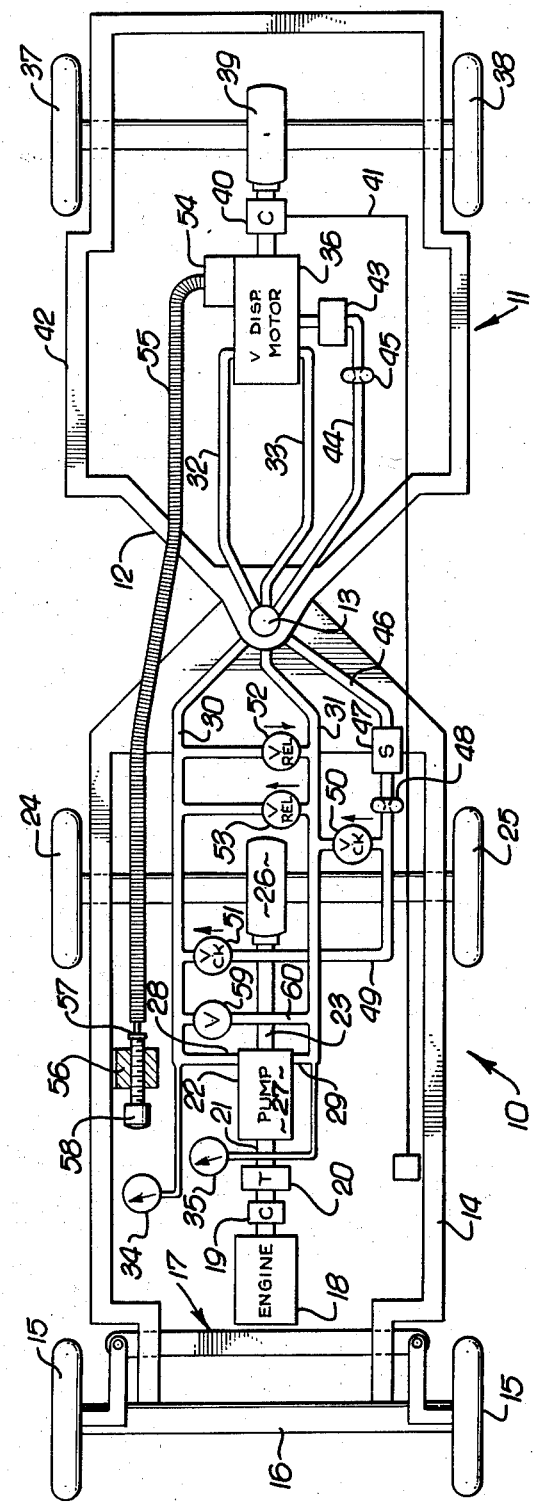
FIG. 1 is a schematic plan of a truck-trailer combination, showing the first embodiment of the invention.
Figure 2:
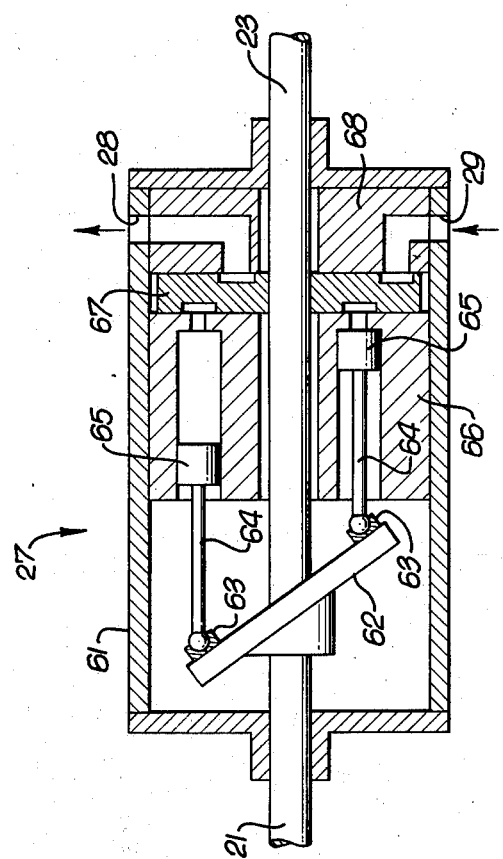
FIG. 2 is a longitudinal section through the pump and power take-off unit.

Referring to FIGS. 1 and 2, the combination includes a towing truck or tractor 10 and a trailer 11, coupled thereto by a drawbar 12 connected through a fifth wheel 13 on the truck chassis 14. It will be understood that other forms of truck and/or trailer, e.g., a trailer having four wheels and not supported by the truck, may be used. The truck has steerable front wheels 15 which are interconnected through king pins and an axle housing 16 and are provided with suitable steering mechanism, shown generally at 17. The truck carries a power plant 18, such as an internal combustion gasoline or diesel engine, a turbine engine of an electric motor, which is coupled through a clutch 19 and a transmission 20 (which may include reversing gears) to the input shaft 21 of the power plant take-off unit 22. It will be understood that the drive system ahead of the unit 22 is merely illustrative and that other arrangements may be employed, such as a direct coupling of the power plant to the shaft 21, or the inclusion of a torque converter. The power take-off unit, shown illustratively in FIG. 2, contains a fixed-displacement pump having an inclined swash plate which is always driven by the shaft 21; however, other types of pumps could be substituted, being preferably of the positive displacement type, e.g., a balanced vane pump, and other forms of power take-off devices may be substituted, for example, a differential divider such as is shown in my patent afore mentioned. The pump is preferably of fixed displacement, but a pump having a variable displacement may be used.

The take-off unit has an output shaft 23 which is directly coupled to the input shaft 21 (being for simplicity shown as being integral therewith) and which is further coupled to the primary driving element, specifically, to the driving wheels 24 and 25 of the truck through a differential gear unit 26. Internally, the pump 27 contracts and expands chambers to provide an outflow of highpressure hydraulic fluid at an outlet port 28 and to receive hydraulic fluid through a port 29. The outlet and inlet are connected to ducts 30 and 31, respectively, which ducts are further connected to ducts 32 and 33, on the trailer by suitable means, these ducts being if desired flexible hoses; but, if desired, these connections may be through a fifth wheel, as shown in my prior U.S. Pat. No. 3,817,341, dated June 18, 1974. Gages 34 and 35, situated to be visible to the operator of the vehicle means, are provided to show the pressures within the duct 30, 32 and 31, 33, respectively. It is evident that other suitable means for indicating the relationship of the pressures within the two ducts, as a differential pressure gage, may be substituted for the gages 34 and 35.

The ducts 32 and 33 are connected to a hydraulic motor 36 of variable displacement which is mounted on the trailer and has its output shaft mechanically coupled to drive (and be driven by) the secondary driving element, specifically, the driving wheels 37 and 38 of the trailer through a differential gear unit 39. A clutch 40, controllable from the cab of the vehicle operator via a hydraulic or electrical or other line 41, is optionally interposed between the motor 36 and the differential gear 39 to place the secondary driving element into free-wheeling, but this is not usually employed, especially when the by-pass valve 59 (to be described) is used. The draw-bar 12 of the trailer is shown to be fast to the chassis 42 of the trailer, but other arrangements may be used. It is evident that rotating parts, such as the motor 36, have their housings fast to the chassis 42.

The motor 36 is connected to a sump 43 which receives leaked hydraulic fluid, this fluid being returned through an auxiliary or third duct 44, aided by a gear pump 45, to a duct 46 into a sump or reservoir 47 on the truck. Hydraulic fluid from the reservoir 47 is pressurized by a gear pump 48 and fed into a conduit 49 from which is returned to the hydraulic system, as through check valves 50 and 51, whereby fluid is returned to the low-pressure duct when the pump 27 is reversible. It will be understood that the hydraulic system may, in practice, include numerous additional auxiliary devices, which are well known and, therefore, not described herein. Usually provided are pressure relief valves 52 and 53, which permit flow from either duct to the other when the pressure difference becomes too great.

For altering and adjusting the displacement of the motor 36 suitable means operable by the vehicle operator are provided. These means may be a displacement changing unit 54, connected by a cable 55, such as a "Morse cable" (which comprises a stiff, flexible wire slidable within a flexible, metallic sheath) or by other means. The "Morse cable" is shown to be fast to an abutment plate 56, having a swivelled but threaded connection to a rotatable part 57, which is controllable by turning a knob 58 for selectivelly pulling or pushing the wire. Rotation of the knob 58 varies the distance of the engaged part of the swash plate from its neutral position and, hence, varies the displacement of the motor. The cable 55 represents any other displacement-changing means which may, for example, be electrical, hydraulic or mechanical.

A by-pass valve 59 is advantageously provided, connected by a duct 60 to the two conduits. Although optional, this valve and duct are very useful in placing the trailer wheels 37 and 38 into their free-wheeling condition and for reducing wear on the pump and motor when the hydraulic system is not used. It is of especial value when the clutch 40 is not used or not provided. However, either the valve 59 and/or the clutch 40 is (are) usually necessary for a satisfactory operation of the system.

Referring to FIG. 2, the power take-off unit and pump 27 comprise a housing 61, fast to the chassis 14, the ends of which journal the shafts 21 and 23. These shafts, shown to be integral, carry for rotation therewith an inclined swash plate 62 having a polished surface and bearing against relatively slidable blocks 63 which bear, through partly spherical surfaces, against the ends of piston rods 64 which are connected to pistons 65. The pistons are reciprocable within longitudinal bores of a cylinder block 66 which is fixed to the housing 61. Any desired number of bores and pistons may be used, such as three to ten. Rotatable with the input shaft is a valving disc 67, situated in juxtaposition to the end of the cylinder block 66 and in close engagement with a non-rotatable valve plate 68. The disc 67 and plate 68 have grooves and ports such that the cylinders in the block 66 which are contracting are placed into communication with the outlet port 28 and those which are expanding are in communication with intake port 29. Such pumps being well-known, a further description of the grooves and ports is omitted. It should be noted that the invention is not restricted to the specific form of pump shown for purposes of illustration and that other types, such as vane pumps or radial pumps, may be substituted.

OPERATION OF FIRST EMBODIMENT

When the vehicle moves forwardly on straight, level road affording good traction, preferably at a uniform speed, and the by-pass valve 59 is closed, the control knob 58 is operated to vary the displacement of the motor 36 so as to bring the pressures within the ducts 30 and 31 (as well as those within the ducts 32 and 33) to substantial equality. These pressures are shown by the gages 34 and 35 (or by other visible means that indicate the relationship of these pressures). This adjusts the displacement of the motor to attain "normal displacement". Thereafter, so long as the vehicle means moves forwardly on straight road affording good traction, no or almost no power is transmitted through the ducts 30–33. Accordingly, only a very small amount of power is lost to the hydraulic system.

When the vehicle means moves on a curve, the trailer wheels take a shorter path than the truck wheels, causing the pump to run faster than the motor (in terms of the rate of fluid displacement). This causes a temporary unbalance in the pressures with the ducts, which is usually accommodated by leakage of fluid in the pump and in the motor, the latter leakage being collected in the sump 43 and returned by the gear pump 45 to the pump sump 47.

When poor traction is encountered, as due to mud, ice, snow, or other causes, several results may follow:

When accelerating forwards, the primary driving element (the truck wheels 24 and 25) may skid forwardly, causing the pump 27 to accelerate, driving the motor 36 to apply power forwards to the trailer wheels 37 and 38. This may cause the pump and, thereby, the primary driving element and engine to rotate more rapidly. The application of driving power to the secondary driving element, i.e., the trailer wheels, aids in promoting the forward motion of the vehicle means. The same result is obtained when moving forwardly under power.

When, upon deceleration or when going down-grade under compression, the primary driving element skids, as when it is driving the engine under compression or the brakes are applied, the primary driving element slows down or is stopped, causing the motor 36 to pump hydraulic fluid which tends to accelerate the pump. This creates a drag on the trailer, reducing thereby the danger of jack-knifing.

When the combination is backed up, i.e., operated in reverse, as by a manipulation of the transmission 20, no hydraulic power is transmitted between the pump and motor so long as no skidding occurs. But if skidding rearwards occurs in the primary driving element, the pump 27 is driven faster, causing the pressure in the ducts 31 and 33 (which now are the high-pressure or supply ducts from the pump to the motor) to rise, driving the secondary driving element to move the trailer backwards.

It is seen that the invention provides for automatic application of hydraulic power to the secondary driving element only when the ratio of ground speeds of the primary and secondary driving elements is altered from normal, forward condition.

Operation of the clutch 40 to disconnect the secondary driving element places the latter into free wheeling, and the foregoing action is not realized.

Similarly, opening of the by-pass valve 59 prevents the transmission of hydraulic power between the pump and the motor, and permits the two to operate at independent speeds. Thereby wear on the pump and motor are reduced.

It may be noted that the clutch 40 and/or the by-pass valve 59 are opened only when operation is on road affording good traction and no need for the automatic application of hydraulic power is envisioned. These elements are not essential, since the hydraulic system, when the motor is correctly set to normal displacement, consumes very little power. But the provision of at least one or the other is usually advantageous, since the adjustment of the motor displacement is often so inexact that complete equality in the pressures within the ducts is not attained, a pressure of 5 to 50 p.s.i. often resulting following an adjustment of the motor displacement. This pressure difference causes a loss of power and the inexactness of the adjustment can be of importance.

Second embodiment

Referring to FIG. 3, there is shown the rear part of a trailer, the other parts being as was described for FIGS. 1 and 2; reference numbers followed by the letter *a* denote parts corresponding to those previously described, and not all are mentioned in the sequel.

The clutch 40 and the differential 39 are eliminated, and each of the wheels 37a and 38a, constituting the secondary driving element, has a separate hydraulic motor 69 or 70, of variable displacement. These motors are caused to have like displacements by a mechanical linkage 71, 72, the lever arms 71 increasing the motor displacements when rotated in one direction and decreasing it when rotated oppositely. Therefore, the displacement of only one motor, e.g., the motor 69, is independently controlled by a displacement changer 54a, controlled by the line 55a. The connecting link 72 may have a variable length to take care of unequal tread diameters between the wheels 37a and 38a, but this is not usually necessary. The two motors are connected hydraulically in parallel, the normally high-pressure supply duct 32a being connected to both motors through branch ducts 73 and 74, the hydraulic fluid being returned from the motors through branch ducts 75 and 76 to the normally los-pressure return duct 33a. The leaked fluid from the motors is collected through a branched duct 77 to the sump 43a.

Operation of second embodiment

The wheels 37a and 38a constituting the secondary driving element can turn independently, due to the parallel hydraulic connection, and the two motors 69 and 70 are constrained to have like displacements, so that only one displacement changer 54a, controlled by the line 55a, is necessary.

All other operations are as was described for the first embodiment.

Third embodiment

Referring to FIG. 4, there is shown a singel vehicle having thereon both the primary and the secondary driving elements. Reference numbers followed by the letter *b* denote parts corresponding to those previously described and most are not mentioned in the sequel.

The vehicle has two rear axles, in tandem of which the first carries the driving wheels 24b and 25b, constituting the primary driving element, and the second carries driving wheels 78 and 79, constituting the secondary driving element, and driven by a differential gear unit 80 which has an input mechanically coupled to the shaft of the hydraulic motor 36b. This motor is connected to the ducts 30b and 31b and is of variable displacement, having a displacement changing unit 54b controlled by a cable 55b.

Operation of third embodiment

The operation of this embodiment is as was described for first, save that no trailer and draw-bar are used, and details regarding these are not applicable. Further, the path taken by the rear-most axle — the secondary driving element — when the truck moves on a curve is not much less — if at all less — than that taken by the primary driving element, so that little if any pressure difference results from going around a curve, However, considerable pressure differences result when hydraulic fluid is flowed through the ducts 30b and 31b, so that there will be leakage of hydraulic fluid from the pump, and a leakage return system such as, for example, that shown by reference numbers 43–51 in FIG. 1 would normally be used. Similarly, auxilliary hydraulic devices may be present.

As in the first embodiment, adjustment is made with the valve 59b closed, moving the truck forwardly on straight road affording good traction, during which the knob 57b is turned to adjust the displacement of the motor 36b until the pressures within the ducts 30b and 31b are substantially equal, the pressure relation being indicated, as by the gages 34b and 35b. Thereafter the hydraulic system is adjusted to normal displacement, and any changes in tread diameters of the several wheels due, for example, to different wheel sizes, wear or inflation pressures, are taken care of. The operation of the vehicle, as well as the opening of the by-pass valve 59b, are as was described above.

A disconnect clutch, corresponding to the clutch 40 of FIG. 1, may if desired by placed between the motor 36b and the differential gear unit 80, being similarly controlled by the truck operator, either in addition to or in lieu of the optional by-pass valve 59b and duct 60b. The clutch is operated as was previously described.

I claim as my invention:

1. In a self-propelled vehicle means having a power plant and primary and secondary ground-engaging driving elements situated on different transverse axes, a drive system which includes:
    a. means drivingly coupled to the primary driving element for driving said element from the power plant,
    b. a positive displacement hydraulic pump coupled to be driven by said power plant, said pump and primary driving element being inter-coupled to operate at a constant speed ratio,
    c. a positive displacement hydraulic motor of variable displacement for each of at least two wheels which collectively constitute the secondary driving element, said motors being coupled to drive said wheels,
    d. first and second duct means interconnecting the pump and said motors,
    e. means connected to less than all of the motors for varying their displacements to establish a desired fixed relationship between the pressures within said first and second duct means, and
    f. means interconnecting said motors to equalize substantially the displacements of the motors.

* * * * *